(12) United States Patent
Rapowitz et al.

(10) Patent No.: US 12,294,648 B2
(45) Date of Patent: May 6, 2025

(54) SYSTEMS AND METHODS FOR VALIDATING TRANSFERS BETWEEN CRYPTOGRAPHIC ADDRESSES

(71) Applicant: Capital One Services, LLC, McLean, VA (US)

(72) Inventors: Samuel Rapowitz, Roswell, GA (US); Kevin Osborn, Newton Highlands, MA (US); Xiaoguang Zhu, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 421 days.

(21) Appl. No.: 17/686,343

(22) Filed: Mar. 3, 2022

(65) Prior Publication Data

US 2023/0283469 A1    Sep. 7, 2023

(51) Int. Cl.
*H04L 9/32* (2006.01)

(52) U.S. Cl.
CPC ..................... *H04L 9/32* (2013.01)

(58) Field of Classification Search
CPC .......... H04L 9/32; H04L 2209/56; H04L 9/50
See application file for complete search history.

(56) References Cited

U.S. PATENT DOCUMENTS

| | | | |
|---|---|---|---|
| 10,812,274 B2 | 10/2020 | Back et al. | |
| 11,501,370 B1 * | 11/2022 | Paya | G06Q 20/3676 |
| 11,522,700 B1 * | 12/2022 | Auerbach | H04L 9/3213 |
| 2016/0224951 A1 | 8/2016 | Hoffberg | |
| 2017/0132615 A1 | 5/2017 | Castinado et al. | |
| 2018/0114205 A1 | 4/2018 | Thomas et al. | |
| 2018/0165598 A1 | 6/2018 | Saxena et al. | |
| 2018/0191503 A1 * | 7/2018 | Alwar | H04L 9/3242 |
| 2018/0293576 A1 | 10/2018 | Song et al. | |
| 2020/0104809 A1 * | 4/2020 | Destefanis | H04L 9/32 |
| 2022/0027992 A1 * | 1/2022 | Blevins | H04L 9/3247 |
| 2023/0169593 A1 * | 6/2023 | Wong | G06Q 40/06 705/37 |

* cited by examiner

*Primary Examiner* — Sarah Su
*Assistant Examiner* — Vladimir I Gavrilenko
(74) *Attorney, Agent, or Firm* — TROUTMAN PEPPER LOCKE LLP; Christopher J. Forstner; John A. Morrissett (57) ABSTRACT

Systems and methods for validating transfers between cryptographic addresses is disclosed. The systems and methods can include receiving instructions to transfer a first plurality of tokens from a first cryptographic address to a second cryptographic address. The transfer can be validated with a portion of the distributed validation processors. The method can include transferring a first plurality of tokens to the second cryptographic address. The method can include transferring a second plurality of tokens to a first distributed validation processor of the plurality of distributed validation processors. After a predetermined period of time and/or subsequent validations by the first distributed validation processors, the method can include transferring an amount greater than the second plurality of tokens to the first cryptographic address.

20 Claims, 6 Drawing Sheets

SYSTEMS AND METHODS FOR VALIDATING TRANSFERS BETWEEN CRYPTOGRAPHIC ADDRESSES

FIELD

The present disclosure relates generally to systems and methods for validating transfers between cryptographic addresses, and more particularly, to a decentralized blockchain system that incentivizes saving and/or donations using a proof of stake model.

BACKGROUND

In recent years consumer saving rates have dropped to historic lows. Consumers are saving less for the future, which can lead to significant issues as consumers approach retirement age. Simultaneously, decentralized ledgers, such as blockchains, have emerged as important tools in the digital economy useful for managing digital assets. The benefits of blockchain technology include heightened trust in digital transactions, decentralization of transactions so that no single entity controls the environment, and increased security. The security comes, in part, by the fact that the entire record of a digital asset is memorialized and encrypted end-to-end.

Cryptocurrencies implemented using blockchain technology largely fall into one of two categories. In the first scheme, called "proof of work," cryptocurrency is "mined" with powerful purpose-built computers. Proof of work blockchains have been criticized for the high energy cost and their negative effect on the environment. The other scheme is called "proof of stake," in which instead of mining cryptocurrency, new tokens are issued to a validator node when a validator node successfully validates a transaction on the blockchain. Validator nodes compete for the right to validate transactions by showing "proof of stake." For example, validator nodes must show a stake in the blockchain environment by holding native tokens. Greater quantities of tokens held by a validator node increases the probability that a respective validator node will be chosen to validate a subsequent transaction. A validator node that is chosen to validate a transaction is rewarded with an additional stake of tokens that can be printed by the protocol.

Consumer use of blockchain technology is quickly gaining adoption. However, consumer savings rates remain low. Additionally, savings accounts offered by traditional financial institutions offer low interest rates, and consumers are interested in new alternatives that can offer a higher savings rate. Accordingly, there is a need to provide a blockchain system that incentivizes an increased consumer savings rate. This application is directed to this and other considerations.

SUMMARY

Examples of the present disclosure provide solutions to the issues associated with incentivizing consumer savings using decentralized blockchain technology. The present disclosure describes a decentralized proof of stake blockchain system that incentivizes increased consumer savings.

A system for validating transfers between cryptographic addresses can include a plurality of distributed validation processors and a plurality of distributed non-transient memories in communication with the plurality of distributed validations processors and storing instructions that when executed by the first plurality of distributed processors are configured to cause the system to perform steps of a method. The method can include receiving instructions to transfer a first plurality of tokens from a first cryptographic address to a second cryptographic address. The method can include validating the transfer with a portion of the plurality of distributed validation processors. The method can include transferring a first portion of the first plurality of tokens to the second cryptographic address. The method can include transferring a second portion of the first plurality of tokens to a first distributed validation processor of the plurality of distributed validation processors. The method can include, after a predetermined period of time, transferring an amount greater than the second portion of the first plurality of tokens to the first cryptographic address.

In another aspect, a system for validating transfers between cryptographic addresses is disclosed. The system can include a plurality of distributed validation processors and a plurality of distributed non-transient memories in communication with the plurality of distributed validations processors and storing instructions that when executed by the first plurality of distributed processors are configured to cause the system to perform steps of a method. The method can include receiving instructions to transfer a first plurality of tokens from a first cryptographic address to a second cryptographic address. The method can include validating the transfer with a portion of the plurality of distributed validation processors. The method can include transferring a first portion of the first plurality of tokens to the second cryptographic address. The method can include transferring a second portion of the first plurality of tokens to a first distributed validation processor of the plurality of distributed validation processors. The method can include, after a predetermined period of time, transferring an amount greater than the second portion of the first plurality of tokens to a third cryptographic address.

In another aspect, a system for validating transfers between cryptographic addresses is disclosed. The system can include a plurality of distributed validation processors and a plurality of distributed non-transient memories in communication with the plurality of distributed validations processors and storing instructions that when executed by the first plurality of distributed processors are configured to cause the system to perform steps of a method. The method can include receiving instructions to transfer a first plurality of tokens from a first cryptographic address to a second cryptographic address. The method can include validating the transfer with a portion of the plurality of distributed validation processors. The method can include transferring a first portion of the first plurality of tokens to the second cryptographic address. The method can include validating the transfer with a portion of the plurality of distributed validation processors. The method can include transferring a first portion of the first plurality of tokens to the second cryptographic address. The method can include transferring a second portion of the first plurality of tokens to a first distributed validation processor of the plurality of distributed validation processors. The method can include, after a predetermined number of subsequent validations by the first distributed validation processor, transferring an amount greater than the second portion of the first plurality of tokens to the first cryptographic address.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner In the drawings.

DETAILED DESCRIPTION

Examples of the present disclosure generally include systems and methods for validating transfers between cryptographic addresses and, more particularly, to a decentralized blockchain system for incentivizing savings and charitable donations. A benefit of the present systems and methods is that the blockchain system can issue additional tokens to users utilize the blockchain system to transfer assets between cryptographic addresses after a predetermined period of time and/or after a predetermined number of subsequent validations by a validator node of the blockchain system. Additionally, the blockchain system can disincentivize fraudulent validations by "slashing" tokens from validator nodes that fraudulently validate transactions on the blockchain system.

Savings and charitable giving incentives can be given to participants of the decentralized blockchain system by providing users a portion of the rewards received by validator nodes for validating a transaction in a proof of stake system. A portion of tokens associated with a user's transfer from a first cryptographic address to a second cryptographic address can be transferred to a respective validator node, and after a predetermined period of time and/or a subsequent number of validations by the respective validator node, a number of tokens greater than the portion of tokens transferred to the validator node can be returned to the first cryptographic address, or to a third cryptographic address designated by the user. Accordingly, the disclosed blockchain system incentivizes saving by providing a way for a user to accrue tokens as a reward for contributing to the proof of stake blockchain ecosystem.

The systems and methods described herein are necessarily rooted in computer technology as they relate to digital security protocols to validate transfers between cryptographic addresses. The entirety of the system is based upon blockchain technology, meaning the data is distributed among a plurality of end-user computers, which make up the nodes of the system. This environment may be different than a typical server or cloud system wherein one entity is in control of the transactions associated with the system. Instead, the blockchain system herein is able to leverage a proof of stake blockchain system to provide incentives for users of the system to increase their savings and/or charitable donations. Savings is automated by receiving a portion of the stake rewards generated by validator nodes to which a user provides tokens for validating transactions.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

Figure 1:
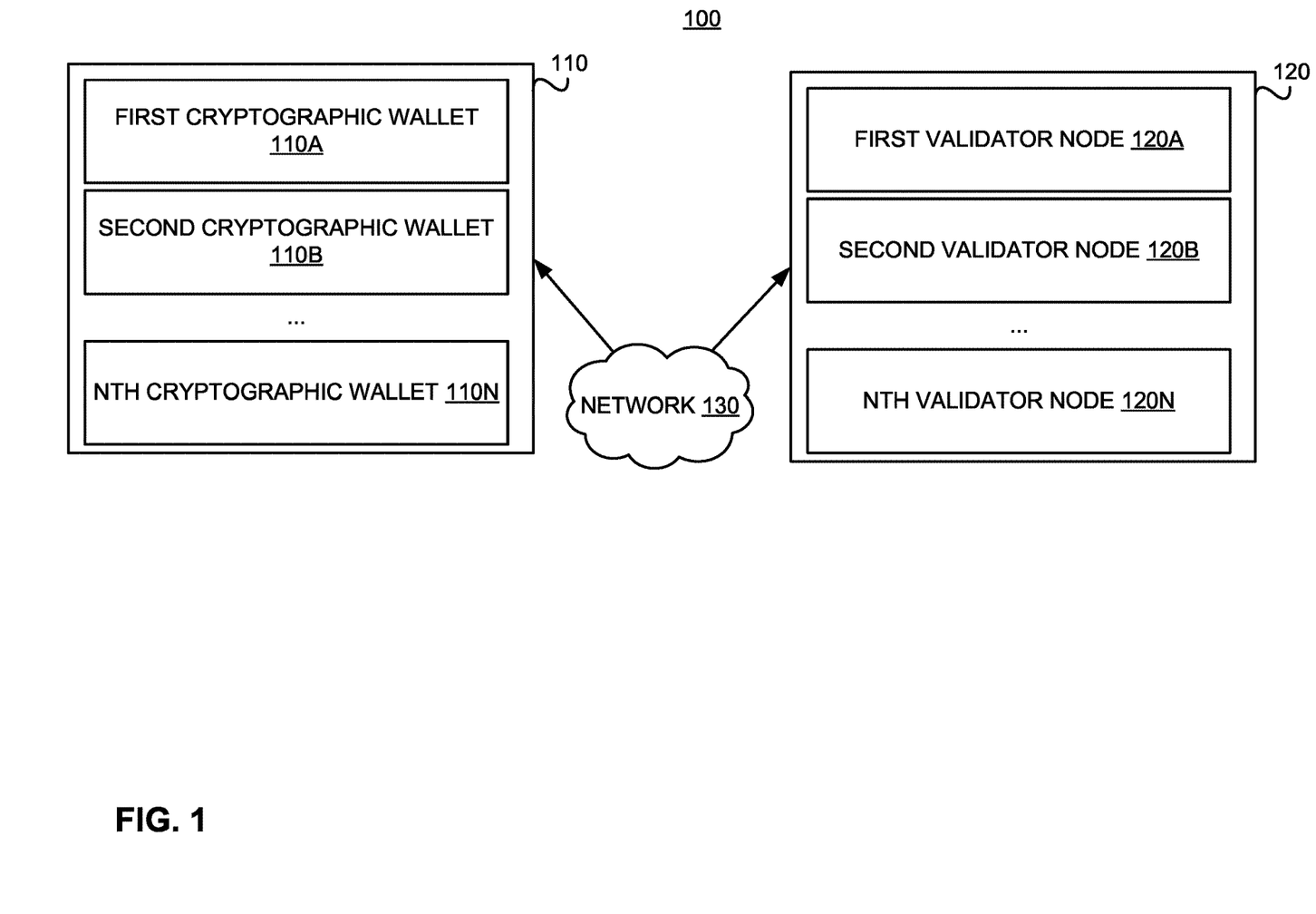
FIG. 1 is a diagram of an example system environment that can be used to implement one or more examples of the present disclosure.

FIG. 1 is a diagram of an example system environment 100 environment that can be used to implement one or more examples of the present disclosure. A more detailed explanation of the components of the system environment 100 is provided below. It is beneficial, however, to provide a brief overview to describe the components of the systems and methods for validating transfers between cryptographic wallet addresses. The system environment 100 can include a plurality of cryptographic wallets 110, for example a first cryptographic wallet 110A, a second cryptographic wallet 110B, a third cryptographic wallet 110C, an $N^{th}$, cryptographic wallet 110N, etc. As will be appreciated, there can be any number of cryptographic wallets 110 within the system environment 100. The system environment 100 can also include a plurality of validator nodes 120, for example a first validator node 120A, a second validator node 120B, a third validator node 120C, an $N^{th}$ validator node 120N, etc. The cryptographic wallet environments 110 and validator nodes 120 can be implemented by computing devices, such as a mobile computing device (e.g., smart phone, tablet computer, smart wearable, portable laptop computer, voice command device, wearable augmented reality device, or other mobile computing device) or a stationary device (e.g., a desktop computer, server, etc.), as will be described below with reference to FIGS. 2-3.

The components/nodes of the system 100 can communicate with each other over a wired or wireless network 130. The network 130 can, therefore, facilitate transactions being made between cryptographic wallet environments 110 (e.g., trades in cryptocurrency, etc.), or between the validator nodes 120 (e.g., for staking tokens to allow validator nodes 120 to be selected to validate a respective transaction). In some embodiments, cryptographic wallet 110 can be implemented by a user device via an application installed on the user device.

Facilitating communication between components of system 100, the network 140 may be of any suitable type, including individual connections via the Internet such as cellular or WiFi networks. In some embodiments, the network 430 may connect terminals, services, and mobile devices using direct connections such as radio-frequency identification (RFID), near-field communication (NFC), Bluetooth™, low-energy Bluetooth™ (BLE), WiFi™ Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
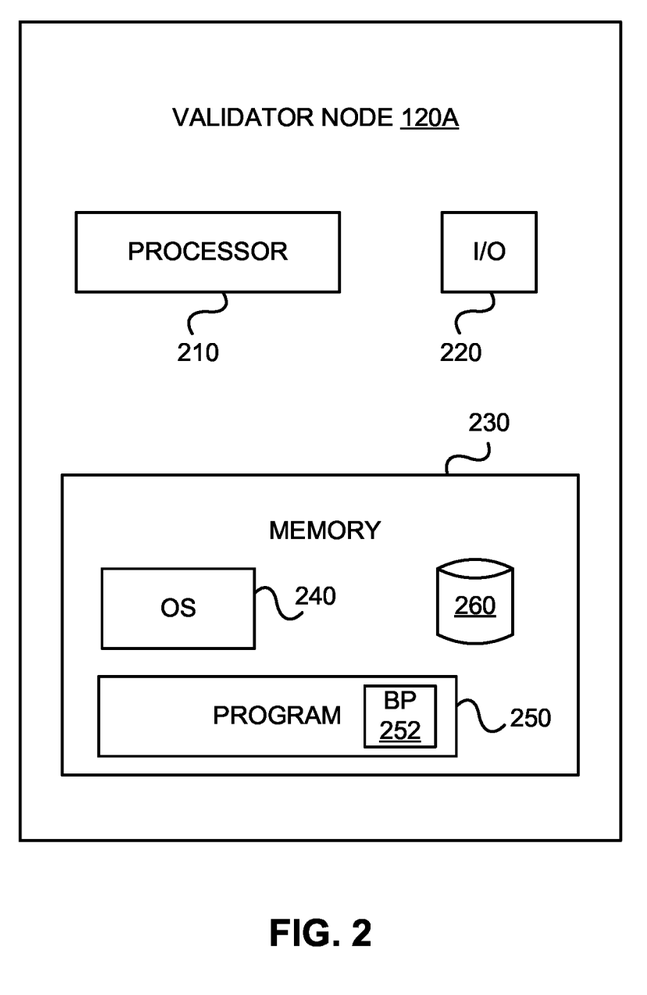
FIG. 2 is a component diagram of an example validator node, according to the present disclosure.

FIG. 2 is a component diagram of an example validator node 120, according to the present disclosure. Validator nodes receive requests from users (e.g., from cryptographic wallets 110) to validate a transfer between a first cryptographic address and a second cryptographic address. Additionally, validator nodes 120 compete to validate transactions, with a respective validator node 120 being probabilistically selected to validate a transaction (e.g., add a block to the distributed blockchain) based on a number of tokens staked by the respective validator node 120. The completed transactions requested by cryptographic wallets 110 can be recorded as transactions to the blockchain by validator nodes 120, and the resultant blocks can be broadcast to all other validator nodes 120 operating within the blockchain. Validator nodes 120 may include a processor 210, an input/output ("I/O") device 220, a memory 230 containing an operating system ("OS") 240, one or more program(s) 250, and a database 260. For example, validator node 120 may be a single device or a server or may be configured as a distributed computer system including multiple servers, devices, or computers that interoperate to perform one or more of the processes and functionalities associated with the disclosed embodiments. In some embodiments, validator node 120 may further include a peripheral interface, a transceiver, a mobile network interface in communication with processor 210, a bus configured to facilitate communication between the various components of validation node 120, and a power source configured to power one or more components of validator node 120. Servers, databases, and other computing devices (e.g., cryptographic wallet environment(s) 110) included in the system 100 may include many components that are similar to or even have the same capabilities as those described with respect to validator node 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™ ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Validator node 120 may include one or more storage devices configured to store information used by the processor 210 (or other components) to perform certain functions related to the disclosed embodiments. In some embodiments, the validator node 120 may include a memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, validator node 120 may include memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, validator node 120 may include memory 230 that may include one or more programs 250 to perform one or more functions of the disclosed embodiments. Moreover, the processor 210 may execute one or more programs 250 located remotely from the validator node 120 (e.g., a program operating on cryptographic wallet environment 110). For example, validator node 120 may access one or more remote programs 250, that, when executed, perform functions related to disclosed embodiments.

The one or more programs 250 can include blockchain protocol ("BP") 252. Blockchain protocol 252 includes software that enforces the same rules for all validator nodes 120 that participate in system 100. BP 252 also includes rules regarding how a respective validator node 120 (e.g., validator node 120A) is selected to validate a transaction (e.g., a transaction between cryptographic wallet 110A and cryptographic wallet 110B) and how validator nodes 120 are rewarded for being selected to validate a predetermined number of transactions by minting or creating additional cryptocurrency tokens and distributing them to the respective validator node (e.g., validator node 120A).

The memory 230 may include one or more memory devices that store data and instructions used to perform one or more features of the disclosed embodiments. The Memory 230 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. The memory 230 may also include software, such as Hadoop™, enabling the system to store and process large volumes of data distributed across a cluster of commodity servers and commodity storage connected via the network 140. The memory 230 databases may consist of files on the system 100 that are simply read into the memory, and the disclosed embodiments are not limited to separate databases or even to the use of a database. The memory 230 may include software components that, when executed by the processor 210, perform one or more processes consistent with the disclosed embodiments. In some embodiments, the memory 230 may include a database 260 for storing related data to enable the system 100 to perform one or more of the processes and functionalities associated with the disclosed embodiments.

Validator node 120 may also be communicatively connected to one or more memory devices (e.g., databases) locally or through the network 140. The remote memory devices may be configured to store information and may be accessed and/or managed by bookmark validator nodes 120. By way of example, the remote memory devices may be document management systems, Microsoft™ SQL database, Mongo databases, SharePoint™ databases, Oracle™ databases, Sybase™ databases, or other relational or non-relational databases. The remote memory devices may also include software, such as Hadoop™, enabling them to store and process large volumes of data distributed across a cluster of commodity servers and commodity storage connected via the network 140. These memory devices may consist of files on the system 100 that are simply read into the memory, and the disclosed embodiments are not limited to separate databases or even to the use of a database. Systems and methods consistent with disclosed embodiments, however, are not limited to separate databases or even to the use of a database.

Validator nodes 120 may also include one or more I/O devices 220 that may comprise one or more interfaces for receiving signals or input from devices and providing signals or output to one or more devices that allow data to be received and/or transmitted by validator nodes 120. For example, validator nodes 120 may include interface components, which may provide interfaces to one or more input devices, such as one or more keyboards, mouse devices, touch screens, track pads, trackballs, scroll wheels, digital cameras, microphones, sensors, scanners, and the like, that enable validator nodes 120 to receive data from one or more users.

In exemplary embodiments of the disclosed technology, validator nodes 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While validator nodes 120 are an example of one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of validator nodes may include a greater or lesser number of components than those illustrated.

Figure 3:
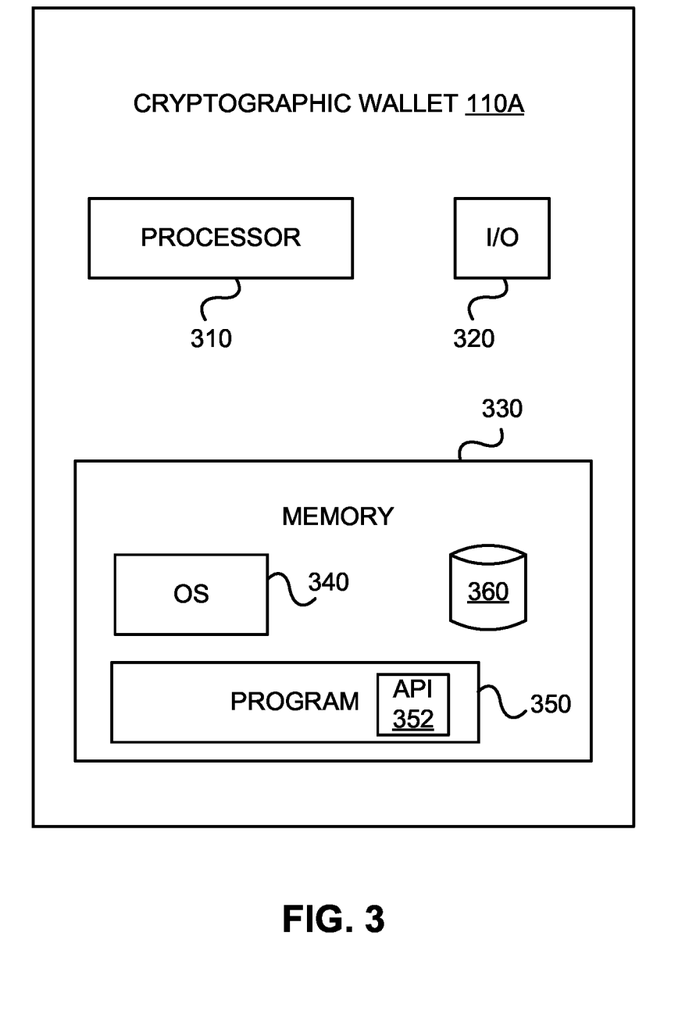
FIG. 3 is a component diagram of an example cryptographic wallet, according to the present disclosure.

FIG. 3 is a component diagram of an example cryptographic wallet environment 110, according to the present disclosure. According to some embodiments, cryptographic wallet environment 110 can be implemented by a computing device, such as a mobile device, desktop computer, laptop, or the like. The cryptographic wallet environment(s) 110 can have many similar components as those described with respect to validator nodes 120. For example, processor 210, I/O 220, memory 230, OS 240, and database 260 are substantially similar to processor 310, I/O 320, memory 330, OS 340, and database 360, and so a full description of these components are omitted here for brevity.

The cryptographic wallet 110 is configured to enable a user of cryptographic wallet 110 to interact with (e.g., sending/receiving cryptocurrency tokens, and/or entering into smart contracts implemented) system 100. The cryptographic wallet 110 can include memory 230 that may include one or more programs 350 to perform one or more functions of the disclosed embodiments. For example, the one or more programs 350 can include API 352 that can enable cryptographic wallet 110A to transact on system 100. For example, API 352 can enable cryptographic wallet 110A to send cryptocurrency tokens (e.g., from a first cryptographic address to a second cryptographic address), receive cryptocurrency tokens, and enter into smart contracts.

A cryptographic wallet is a program that can interact with a nodes of a blockchain (e.g., validator nodes 120) to store, send, and receive cryptocurrency tokens native to the blockchain. Each cryptographic wallet has associated public-private key pairs. A wallet cryptographic address is generated based on the public key pair associated with the cryptographic wallet. Users who are given the public key can transfer tokens to the cryptographic wallet associated with the public key, but are not able to spend the tokens without access to the private key. The private key can be used by a user of cryptographic wallet 110 to execute transactions (e.g., transferring cryptographic tokens from one cryptographic address to another).

Figure 4:
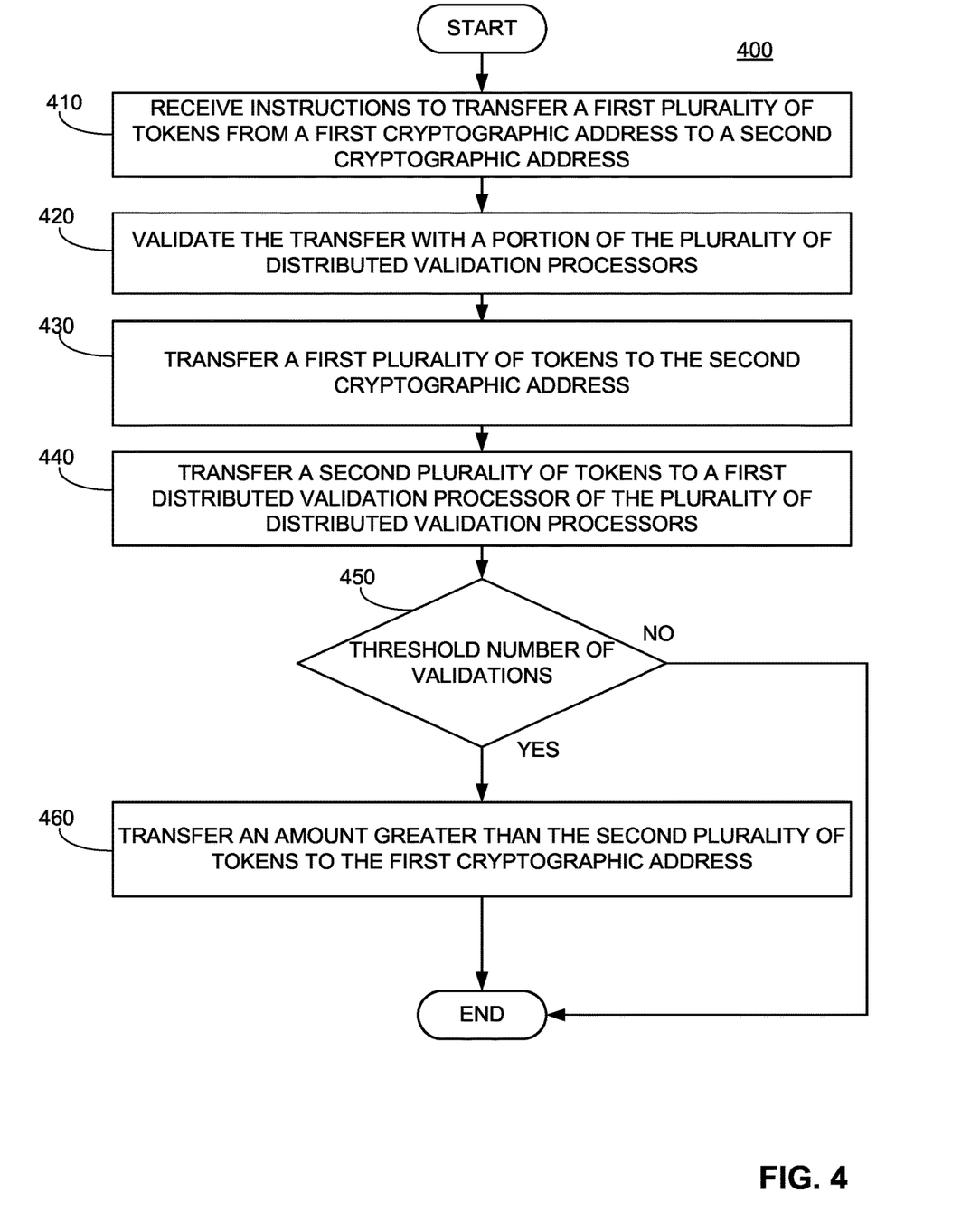
FIG. 4 is a flowchart of an example method for validating transfers between cryptographic addresses, according to the present disclosure.

FIG. 4 is a flowchart of an example method for validating transfers between cryptographic addresses, according to the present disclosure. In block 410, the method can include receiving instructions to transfer a first plurality of tokens from a first cryptographic address to a second cryptographic address. For example, a first user of cryptographic wallet 110A may wish to transfer a first plurality of tokens to cryptographic wallet 110B under control of a second user. Accordingly, cryptographic wallet 110A may issue a request using API 352 for system 100 to validate a transaction between cryptographic wallet 110A and cryptographic wallet 110B.

In block 420, the method can include validating the transfer with a portion of the plurality of distributed validation processors 120. Once a cryptographic wallet has issued a request, the request can be distributed to the validation processors 120. Validation processors 120 may compete among each other to determine which respective validation processor 120 (e.g., validation processor 120A, validation processor 120B, . . . , validation processor 120N) will be the one to validate the transaction based on the transaction request of block 410. According to some embodiments, the validation node 120 may be selected probabilistically, with an increased probability for validation nodes 120 proportionally with an amount of cryptocurrency tokens that are "staked" to the respective validation node 120. For example, a validation node 120A may have 10,000 cryptocurrency tokens and validation node 120B may have 1,000 cryptocurrency tokens. If validation node 120A and validation node 120B are the only validation nodes 120 on system 100, then validation node 120A would have a ten times greater probability of being selected to validate the next transaction to be written to a block on the blockchain system. Accordingly, a validation node 120 is selected to validate the transaction based on the request of block 410.

In block 430, the method can include transferring a first plurality of tokens to the second cryptographic address. For example, cryptocurrency wallet 110A can transfer the first plurality of tokens from a cryptographic address under the custody of cryptocurrency wallet 110A to a second cryptographic address under the custody of cryptocurrency wallet 110B.

In block 440, the method can include transferring a second plurality of tokens to a first distributed validation processor of the plurality of distributed validation processors in response to transferring the first plurality of tokens to the second cryptographic address. For example, a first user of, e.g., cryptographic wallet 110A, may wish to exchange 100 cryptocurrency tokens in exchange for goods or services with a second user of cryptographic wallet 110B. In addition, the first user wishes to set aside a percentage of the transaction amount to contribute to his personal savings goal. For example, the first user can select an amount as a percentage of the transaction amount (e.g., a percentage of the first plurality of tokens) to include in the transfer as the second plurality of tokens.

In block 450, the method can include determining whether the first distributed validation processor (e.g., validation node 120A) has validated a threshold number of subsequent validations. According to some embodiments, the threshold number of subsequent validations can be a single subsequent validation of a transaction. In some embodiments, the threshold number of validations can be a plurality of subsequent validations that can be validated by the first distributed validation processor. According to some embodiments, the block 450 step can be based on a predetermined period of time instead of a subsequent number of transactions. For example, the user can enter into a smart contract that allows the first distributed validation processor (e.g., validation node 120A) to maintain control over the second plurality of tokens for a predetermined period of time such as a day, a week, a month, a year, or the like. In response to the threshold number of validations not being met (or the predetermined period of time not being met), the method may end. In response to the threshold number of validations (or the predetermined period of time being met), the method can move to block 460.

In block 460, the method can include transferring an amount greater than the second plurality of tokens to the first cryptographic address. For example, the first distributed validation processors (e.g., validation node 120A) can receive additional tokens for every successfully validated transaction validated by the first distributed validation processor. In some examples, the validation node 120A can receive additional tokens by loaning at least a portion of the second plurality of tokens to a third party (e.g., a third cryptographic wallet 110C). For example, the validation node 120A can enter into a smart contract with the third cryptographic wallet 110C that loans at least a portion of the second plurality of tokens to the third cryptographic wallet for a predetermined period of time with a predetermined rate of interest. After the predetermined period of time, the validation node 120A can transfer an amount greater than the second plurality of tokens to the first cryptographic address (e.g., to cryptographic wallet 110A).

According to some embodiments, the exact amount that first cryptographic addresses may receive from the first distributed validation processor can be based in part on the length of the predetermined period of time. For example, if the first distributed validation processor enters into a smart contract with the third cryptographic wallet 110C), the longer the period of the loan, the more tokens are returned to the first distributed validation processor. Accordingly, more tokens can be returned proportionally to the predetermined period of time.

According to some embodiments, the tokens of the first plurality of tokens and the second plurality of tokens can be tokens native to blockchain system 100. That is, the tokens can be solely created and issued by the protocol (e.g., BP 252) that is executed by the plurality of validation processors 120 of system 100.

According to some embodiments, and as will be described in more detail with respect to FIG. 6, at least a portion of the amount greater than the second plurality of tokens that is ultimately returned to the first cryptographic address (e.g., cryptographic wallet 110A) can be received from a second distributed validation processor that issued an invalid transfer of tokens.

According to some embodiments, after a respective validation node 120 validates a transaction on the blockchain, the transaction can be subsequently verified by a plurality of validation nodes 120. In some embodiments, validating the transfer includes validating the transfer with a majority of the plurality of distributed validation processors.

Figure 5:
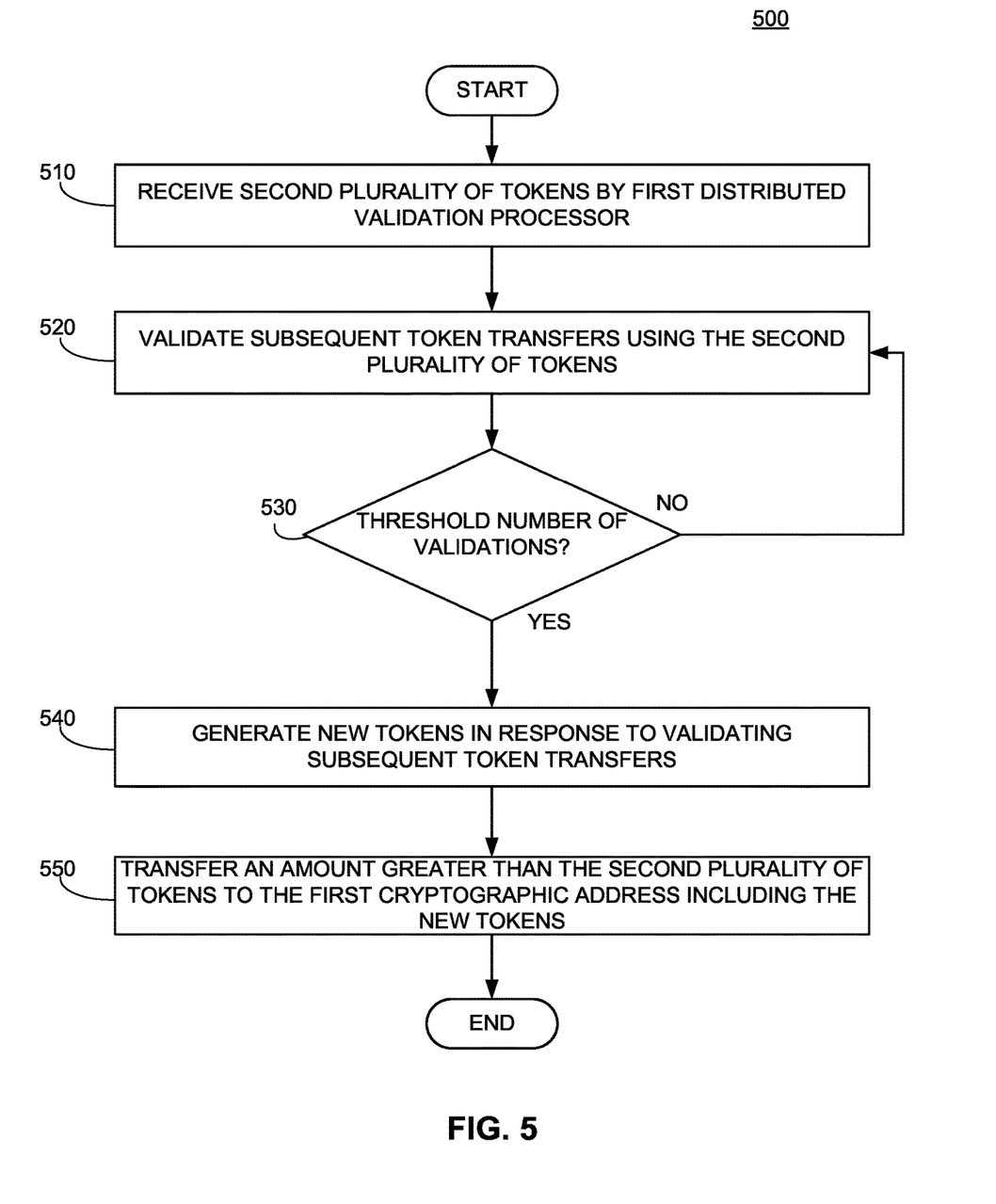
FIG. 5 is a flowchart of an example method for generating new tokens, according to the present disclosure.

FIG. 5 is a flowchart of an example method for generating new tokens, according to the present disclosure. In block 520, the method can include receiving a second plurality of tokens by the first distributed validation processor (e.g., validation node 120A). According to some examples, the second plurality of tokens can be received from a cryptographic wallet (e.g., cryptographic wallet 110A) that enters into a savings smart contract with the first distributed validation processor. For example, a user of cryptographic wallet 110A may transfer 100 cryptographic tokens to validation node 120A under a smart contract that guarantees a return of 150 cryptographic tokens to the cryptographic wallet 110A after a predetermined period of time or a subsequent number of transaction validations of validation node 120A.

In block 520, the method can include validating, by validation node 120A, a predetermined number of subsequent token transfers. The second plurality of tokens are used by validation node 120A to provide a proof of stake that increases the probability that validation node 120A is chosen to validate the subsequent transactions, proportionally to the number of tokens under control of validation node 120A.

In decision block 530, the method can include determining whether a subsequent number of validations by the validation node 120A has met a predetermined threshold. In some embodiments, the method can include determining whether a threshold period of time has passed since the second plurality of tokens were received by validation node 120A. In response to the threshold being met, the method can move to block 540. In response to the threshold not being met, the method may end.

In block 540, the method can include generating new tokens in response to the validation node (e.g., validation node 120A) validating a threshold number of subsequent transactions. For example, BP 252 can include protocol rules for generating new tokens and providing the new tokens to a validation node that successfully validates a transaction.

In block 550, the method can include transferring an amount greater than the second plurality of tokens to the first cryptographic address. The amount greater than the second plurality of tokens can include the new tokens generated by BP 252 and distributed validation processor 120A. Accordingly, returning to our example, validation node 120A can transfer 150 cryptographic tokens to cryptographic wallet 110A after the predetermined period of time and/or the predetermined number of subsequent transaction validations.

Figure 6:
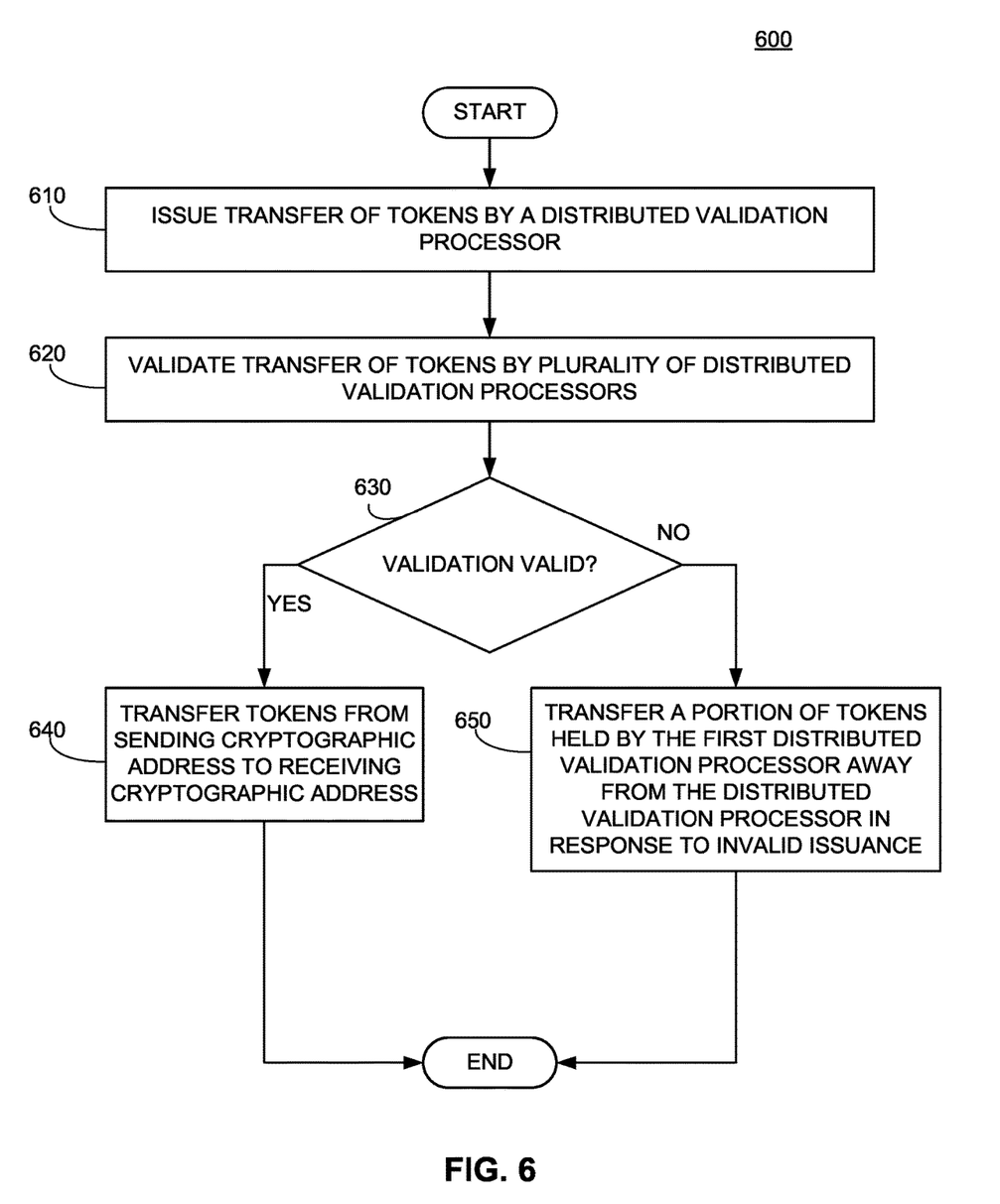
FIG. 6 is a flowchart of an example method for disincentivizing fraudulent transactions, according to the present disclosure.

FIG. 6 is a flowchart of an example method for disincentivizing fraudulent transactions, according to the present disclosure. Similarly to how the BP 252 incentivizes validation nodes to validate transactions, BP 252 can also include disincentives for validation nodes 120 that fraudulently or incorrectly validate transactions. In some embodiments, the savings earned by cryptographic wallets 110A can be at least partially funded by tokens taken away from validation nodes 120 that fraudulently or incorrectly validate a transaction.

In block 610, the method can include issuing a transfer of tokens by a distributed validation processor (e.g., validation node 120C). The purported transfer can be between cryptographic wallet 110C to cryptographic wallet 110D; however, no such transfer has been requested by the user of cryptographic wallet 110C. Instead, an entity or user associated with cryptographic wallet 110D may wish to instruct validation node 120C to fraudulently validate such a transfer in order to fraudulently take tokens from a user of cryptographic wallet 110C.

In block 620, the method can include validating the transfer of tokens by a plurality of the distributed validation processors (e.g., validation nodes 120). Although validation node 120C may have been coopted by a user or entity associated with cryptographic wallet 110D, a plurality of validation nodes (e.g., validation node 120A, validation node 120B, etc.) may not have been co-opted by a user or entity associated with cryptographic wallet 110D. Accordingly, in decision block 630, the method can include determining whether the validation by validation node 120C was valid. In block 640, in response to determining that the transfer was valid, the method can include transferring tokens from the sending cryptographic address (e.g., cryptographic wallet 110C) to the receiving cryptographic address (e.g., cryptographic wallet 110D). In response to determining that the transfer was invalid, block 650 can include transferring at least a portion of the tokens held by the respective distributed validation processor (e.g., validation node 120C) away from the distributed validation processor in response to the invalid transfer of block 610. According to some embodiments, the savings incentive provided to a cryptographic wallet (e.g., cryptographic wallet 110A) can be at least partially funded by transferring tokens from a validation node 120 that fraudulently issues a transaction to the cryptographic wallet.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A system for validating transfers between cryptographic addresses, the system comprising: a plurality of distributed validation processors; a plurality of distributed non-transient memories in communication with the plurality of distributed validation processors and storing instructions, that when executed by the plurality of distributed validation processors are configured to cause the system to: receive instructions to transfer a first plurality of tokens from a first cryptographic address to a second cryptographic address; validate the transfer with a portion of the plurality of distributed validation processors; transfer the first plurality of tokens to the second cryptographic address; transfer a second plurality of tokens to a first distributed validation processor of the plurality of distributed validation processors; and after a predetermined period of time, transfer an amount greater than the second plurality of tokens to the first cryptographic address.

Clause 2: The system of clause 1, wherein the amount greater than the second plurality of tokens is determined based on the predetermined period of time.

Clause 3: The system of clause 1, wherein the second plurality of tokens are used by the first distributed validation processor to validate a plurality of token transfers during the predetermined period of time.

Clause 4: The system of clause 1, wherein each token of the first plurality of tokens and the second plurality of tokens each comprise a native token associated with a first blockchain implemented by the plurality of distributed validation processors.

Clause 5: The system of clause 1, wherein a portion of the amount greater than the second plurality of tokens is transferred from a second distributed validation processor that issued an invalid transfer of tokens.

Clause 6: The system of clause 1, wherein a portion of the amount greater than the second plurality of tokens are new tokens created in response to the first distributed validation processor validating a subsequent token transfer.

Clause 7: The system of clause 6, wherein the first distributed validation processor has a probability of being selected to create the new tokens proportional to a quantity of tokens in control of the first distributed validation processor.

Clause 8: The system of clause 1, wherein each of the plurality of distributed validation processors are required to control a threshold quantity of tokens prior to validating a transfer of tokens.

Clause 9: The system of clause 1, wherein the transfer of the second plurality of tokens to a first distributed validation processor is implemented by a smart contract executed by the plurality of distributed validation processors.

Clause 10: The system of clause 9, wherein the smart contract comprises instructions to loan the second plurality of tokens to a third cryptographic address for the predetermined period of time and receive from the third cryptographic address the amount greater than the second plurality of tokens after the predetermined period of time.

Clause 11: The system of clause 1, wherein validating the transfer comprises validating the transfer with a majority of the plurality of distributed validation processors.

Clause 12: A system for validating transfers between cryptographic addresses, the system comprising: a plurality of distributed validation processors; a plurality of distributed non-transient memories in communication with the plurality of distributed validation processors and storing instructions, that when executed by the plurality of distributed validation processors are configured to cause the system to: receive instructions to transfer a first plurality of tokens from a first cryptographic address to a second cryptographic address; validate the transfer with a portion of the plurality of distributed validation processors; transfer the first plurality of tokens to the second cryptographic address; transfer a second plurality of tokens to a first distributed validation processor of the plurality of distributed validation processors; and after a predetermined period of time, transfer an amount greater than the second plurality of tokens to a third cryptographic address.

Clause 13: The system of clause 12, wherein the third cryptographic address is associated with a charity selected by a user of the first cryptographic address.

Clause 14: The system of clause 12, wherein the amount greater than the second portion is determined based on the predetermined period of time.

Clause 15: The system of clause 12, wherein the second portion of the first plurality of tokens are used by the first distributed validation processor to validate a plurality of token transfers during the predetermined period of time.

Clause 16: The system of clause 12, wherein a portion of the amount greater than the second portion of the first plurality of tokens is transferred from a second distributed validation processor that issued an invalid transfer of tokens.

Clause 17: The system of clause 12, wherein a portion of the amount greater than the second portion of the first plurality of tokens are new tokens created in response to the first distributed validation processor validating a subsequent token transfer.

Clause 18: The system of clause 17, wherein the first distributed validation processor has a probability of being selected to create the new tokens proportional to a quantity of tokens in control of the first distributed validation processor.

Clause 19: The system of clause 12, wherein each of the plurality of distributed validation processors are required to control a threshold quantity of tokens prior to validating a transfer of tokens.

Clause 20: A system for validating transfers between cryptographic addresses, the system comprising: a plurality of distributed validation processors; a plurality of distributed non-transient memories in communication with the plurality of distributed validation processors and storing instructions, that when executed by the plurality of distributed validation processors are configured to cause the system to: receive instructions to transfer a first plurality of tokens from a first cryptographic address to a second cryptographic address; validate the transfer with a portion of the plurality of distributed validation processors; transfer a first portion of the first plurality of tokens to the second cryptographic address; transfer a second portion of the first plurality of tokens to a first distributed validation processor of the plurality of distributed validation processors; and after a predetermined number of subsequent validations by the first distributed validation processor, transfer an amount greater than the second portion of the first plurality of tokens to the first cryptographic address.

Exemplary Use Cases

The following exemplary use cases describe examples of a typical user flow pattern. They are intended solely for explanatory purposes and not limitation.

Albert is a user of the disclosed blockchain system and wishes to transfer 100 tokens to his friend Liam in return for goods or services. Albert is also saving up to move out of his parent's home and into his own apartment. Accordingly, Albert uses his cryptographic wallet to transfer to Liam. His wallet interface provides a notification that he can select an additional amount to contribute to the blockchain protocol for a set time period or set number of validations in return for a 200% return. Albert selects 50 tokens to contribute to the network and 50 tokens are transferred from Albert's cryptographic wallet to a validator node of the blockchain system using a smart contract that is executed by the validator nodes of the blockchain protocol. The validator node now controls 50 tokens which increase the probability that this validator node will be selected to validate subsequent transactions occurring on the blockchain. Timothy initiates a transfer with Robert on the same blockchain network, and the validator node that Albert sent 50 tokens is chosen to validate the transaction. In return, the blockchain protocol can issue 50 additional tokens to the validator node for a successful validation of a transaction. After a predetermined number of subsequent validations (e.g., one or more validations), 100 tokens are transferred back to Albert's cryptographic wallet. Albert trades these 100 tokens for its USD value and uses his earnings to put a deposit down on his own apartment.

In another example, Albert transacts with Liam, but instead of saving, he wishes to make a charitable donation to his local art gallery. Albert sends Liam 100 tokens, and wishes to use 50 tokens to accrue additional tokens that he will transfer to a wallet in control of his local art gallery. Albert enters into a smart contract with a validator node that transfers 50 tokens to the validator node. The smart contract provides that the validator node 120 can loan out the 50 tokens to another cryptographic wallet controlled by Ricky in return for an interest rate. After 6 months, Ricky transfers 75 tokens back to the validator node. The validator node can then transfer 75 tokens to the art gallery's cryptographic wallet on behalf of Albert.

What is claimed is:

1. A system for validating transfers between cryptographic addresses, the system comprising:
   a plurality of distributed validation processors;
   a plurality of distributed non-transient memories in communication with the plurality of distributed validation processors and storing instructions, that, when executed by the plurality of distributed validation processors, are configured to cause the system to:
      receive instructions to transfer a first plurality of tokens from a first cryptographic address associated with a first user to a second cryptographic address associated with a second user;
      select a portion of the plurality of distributed validation processors to validate the transfer, the selection based on one or more rules and the selection being made probabilistically such that a probability of a particular distributed validation processor being selected increases proportionally with an amount of tokens that are staked to the respective distributed validation processor;
      validate the transfer with the portion of the plurality of distributed validation processors;
      transfer the first plurality of tokens to the second cryptographic address associated with the second user;
      responsive to transferring the first plurality of tokens to the second cryptographic address, transfer a second plurality of tokens to a first distributed validation processor of the plurality of distributed validation processors; and
      after a predetermined period of time, transfer an amount greater than the second plurality of tokens to the first cryptographic address associated with the first user.

2. The system of claim 1, wherein the amount greater than the second plurality of tokens is determined based on the predetermined period of time.

3. The system of claim 1, wherein the second plurality of tokens are used by the first distributed validation processor to validate a plurality of token transfers during the predetermined period of time.

4. The system of claim 1, wherein each token of the first plurality of tokens and the second plurality of tokens comprise a native token associated with a first blockchain implemented by the plurality of distributed validation processors.

5. The system of claim 1, wherein a portion of the amount greater than the second plurality of tokens is transferred from a second distributed validation processor that issued an invalid transfer of tokens.

6. The system of claim 1, wherein a portion of the amount greater than the second plurality of tokens are new tokens created in response to the first distributed validation processor validating a subsequent token transfer.

7. The system of claim 6, wherein the first distributed validation processor has a probability of being selected to create the new tokens proportional to a quantity of tokens in control of the first distributed validation processor.

8. The system of claim 1, wherein each of the plurality of distributed validation processors are required to control a threshold quantity of tokens prior to validating a transfer of tokens.

9. The system of claim 1, wherein the transfer of the second plurality of tokens to a first distributed validation processor is implemented by a smart contract executed by the plurality of distributed validation processors.

10. The system of claim 9, wherein the smart contract comprises instructions to loan the second plurality of tokens to a third cryptographic address for the predetermined period of time and receive from the third cryptographic address the amount greater than the second plurality of tokens after the predetermined period of time.

11. The system of claim 1, wherein validating the transfer comprises validating the transfer with a majority of the plurality of distributed validation processors.

12. The system of claim 1, wherein the one or more rules correspond to one or more criterion.

13. The system of claim 1, wherein the instructions, when executed by the plurality of distributed validation processors, are further configured to cause the system to:
   receive a user input generated by the first user, the user input being representative of a percentage; and
   determine an amount of the second plurality of tokens by multiplying the percentage by an amount of the first plurality of tokens.

14. A system for validating transfers between cryptographic addresses, the system comprising:
   a plurality of distributed validation processors;
   a plurality of distributed non-transient memories in communication with the plurality of distributed validation processors and storing instructions, that when executed by the plurality of distributed validation processors are configured to cause the system to:
      receive instructions to transfer a first plurality of tokens from a first cryptographic address associated with a first user to a second cryptographic address associated with a second user;
      select a portion of the plurality of distributed validation processors to validate the transfer, the selection based on one or more rules and the selection being made probabilistically such that a probability of a particular distributed validation processor being selected increases proportionally with an amount of tokens that are staked to the respective distributed validation processor;
      validate the transfer with the portion of the plurality of distributed validation processors;
      transfer the first plurality of tokens to the second cryptographic address associated with the second user;
      responsive to transferring the first plurality of tokens to the second cryptographic address, transfer a second plurality of tokens to a first distributed validation processor of the plurality of distributed validation processors; and
      after a predetermined period of time, transfer an amount greater than the second plurality of tokens to a third cryptographic address.

15. The system of claim 14, wherein the third cryptographic address is associated with a charity selected by a user of the first cryptographic address.

16. The system of claim 14, wherein the second plurality of tokens are used by the first distributed validation processor to validate a plurality of token transfers during the predetermined period of time.

17. The system of claim 14, wherein a portion of the amount greater than the second plurality of tokens are new tokens created in response to the first distributed validation processor validating a subsequent token transfer.

18. The system of claim 17, wherein the first distributed validation processor has a probability of being selected to create the new tokens proportional to a quantity of tokens in control of the first distributed validation processor.

19. The system of claim 14, wherein each of the plurality of distributed validation processors are required to control a threshold quantity of tokens prior to validating a transfer of tokens.

20. A system for validating transfers between cryptographic addresses, the system comprising:
- a plurality of distributed validation processors;
- a plurality of distributed non-transient memories in communication with the plurality of distributed validation processors and storing instructions, that when executed by the plurality of distributed validation processors are configured to cause the system to:
  - receive instructions to transfer a first plurality of tokens from a first cryptographic address associated with a first user to a second cryptographic address associated with a second user;
  - select a portion of the plurality of distributed validation processors to validate the transfer, the selection based on one or more rules and the selection being made probabilistically such that a probability of a particular distributed validation processor being selected increases proportionally with an amount of tokens that are staked to the respective distributed validation processor;
  - validate the transfer with the portion of the plurality of distributed validation processors;
  - transfer a first plurality of tokens to the second cryptographic address associated with the second user;
  - responsive to transferring the first plurality of tokens to the second cryptographic address, transfer a second plurality of tokens to a first distributed validation processor of the plurality of distributed validation processors; and
  - after a predetermined number of subsequent validations by the first distributed validation processor, transfer an amount greater than the second plurality of tokens to the first cryptographic address associated with the first user.

\* \* \* \* \*